(12) United States Patent
Beaston

(10) Patent No.: US 9,328,713 B2
(45) Date of Patent: May 3, 2016

(54) TURBINE APPARATUS AND METHODS

(71) Applicant: Steven D. Beaston, Delaware City, DE (US)

(72) Inventor: Steven D. Beaston, Delaware City, DE (US)

( * ) Notice: Subject to any disclaimer, the term of this patent is extended or adjusted under 35 U.S.C. 154(b) by 347 days.

(21) Appl. No.: 13/862,223

(22) Filed: Apr. 12, 2013

(65) Prior Publication Data

US 2013/0302165 A1    Nov. 14, 2013

Related U.S. Application Data

(60) Provisional application No. 61/624,081, filed on Apr. 13, 2012.

(51) Int. Cl.
| | | |
|---|---|---|
| F03B 3/14 | (2006.01) | |
| F03B 3/12 | (2006.01) | |
| F03B 13/14 | (2006.01) | |

(52) U.S. Cl.
CPC . *F03B 3/14* (2013.01); *F03B 13/14* (2013.01); *F05B 2250/25* (2013.01); *Y02E 10/38* (2013.01)

(58) Field of Classification Search
CPC ........ F03B 3/14; F03B 13/14; F05B 2250/25; Y02E 10/38
USPC ..... 416/11, 176, 223 R, 210 R; 415/204, 4.2; 290/55, 44
IPC .......................................................... F03D 3/06
See application file for complete search history.

(56) References Cited

U.S. PATENT DOCUMENTS

| | | | | |
|---|---|---|---|---|
| 1,100,332 | A | * | 6/1914 | Smith ................... F04D 29/281 |
| | | | | 416/175 |
| 1,796,732 | A | * | 3/1931 | Thompson .................... 415/130 |
| 3,922,739 | A | | 12/1975 | Babintsev |
| 4,424,451 | A | | 1/1984 | Schmidt |
| 4,463,555 | A | | 8/1984 | Wilcoxson |
| 4,524,285 | A | | 6/1985 | Rauch |
| 4,613,279 | A | | 9/1986 | Corren et al. |
| 4,849,647 | A | | 7/1989 | McKenzie |
| 5,405,246 | A | * | 4/1995 | Goldberg .................. 416/227 A |
| 5,425,617 | A | * | 6/1995 | Teran ............................. 416/176 |
| 5,642,984 | A | * | 7/1997 | Gorlov .......................... 416/176 |
| 5,798,572 | A | | 8/1998 | Lehoczky |
| 6,168,373 | B1 | | 1/2001 | Vauthier |
| 6,406,251 | B1 | | 6/2002 | Vauthier |
| 6,806,586 | B2 | | 10/2004 | Wobben |
| 6,831,373 | B1 | * | 12/2004 | Beaston .......................... 290/44 |

(Continued)

FOREIGN PATENT DOCUMENTS

| | | | | | |
|---|---|---|---|---|---|
| EP | 2657514 | A1 | * | 10/2013 | ............... F03D 3/06 |
| GB | 179197 | A | * | 1/1923 | ............... F03B 3/04 |

(Continued)

*Primary Examiner* — Thai Ba Trieu
(74) *Attorney, Agent, or Firm* — Matthew A. Pequignot; Pequignot + Myers LLC

(57) ABSTRACT

Turbines and methods for their use, for generating power utilizing the flow of water or other fluids. In certain embodiments, turbines with helical blades oriented to efficiently intercept off axis or angular fluid flow, such as presented by whirlpool water flow patterns. In certain preferred embodiments, turbines having helical blades with major blade surfaces oriented to take advantage of whirlpool or circular-angle flow patterns, depending on geographic location of installation in the northern or southern hemisphere. In still other embodiments, turbines in which the pitch of rotor and/or helical blade surfaces is variable.

5 Claims, 4 Drawing Sheets

(56) References Cited

U.S. PATENT DOCUMENTS

| | | | |
|---|---|---|---|
| 6,933,624 B2 * | 8/2005 | Beaston | 290/44 |
| 7,042,114 B2 | 5/2006 | Tharp | |
| 7,156,609 B2 * | 1/2007 | Palley | 415/4.2 |
| 7,190,087 B2 | 3/2007 | Williams | |
| 7,291,936 B1 | 11/2007 | Robson | |
| 7,344,353 B2 * | 3/2008 | Naskali et al. | 415/4.2 |
| 7,494,315 B2 * | 2/2009 | Hart | F03D 3/061 415/176 |
| 7,615,882 B2 | 11/2009 | Riley | |
| 7,952,219 B2 | 5/2011 | Riley | |
| 7,972,108 B2 | 7/2011 | Fonkenell | |
| 8,097,218 B1 | 1/2012 | Manaugh | |
| 8,102,068 B1 | 1/2012 | Gutekunst | |
| 8,251,662 B2 * | 8/2012 | Parker | 416/176 |
| 8,690,541 B2 * | 4/2014 | McGuire | F03B 3/123 416/176 |
| 2004/0250537 A1 | 12/2004 | Krouse | |
| 2004/0253097 A1 * | 12/2004 | Kao | 415/204 |
| 2005/0248161 A1 | 11/2005 | Heidel | |
| 2007/0122279 A1 | 5/2007 | Sredzki et al. | |
| 2007/0292259 A1 | 12/2007 | Choie | |
| 2008/0116692 A1 | 5/2008 | Lagstrom | |
| 2008/0122224 A1 | 5/2008 | Van Berkel | |
| 2009/0115193 A1 | 5/2009 | Branco | |
| 2009/0243293 A1 | 10/2009 | Farb | |
| 2009/0257863 A1 | 10/2009 | Prioreschi | |
| 2010/0066090 A1 | 3/2010 | Newcomer | |
| 2010/0077749 A1 | 4/2010 | Riley | |
| 2010/0109325 A1 | 5/2010 | Hupe et al. | |
| 2010/0135766 A1 | 6/2010 | Allaei | |
| 2010/0140946 A1 | 6/2010 | Zheng | |
| 2010/0207394 A1 | 8/2010 | Leung | |
| 2010/0244452 A1 | 9/2010 | Gardner | |
| 2010/0307154 A1 | 12/2010 | Ben Lolo | |
| 2010/0310376 A1 | 12/2010 | Houvener et al. | |
| 2010/0327591 A1 | 12/2010 | Dick et al. | |
| 2011/0018278 A1 | 1/2011 | Tomaini | |
| 2011/0025071 A1 * | 2/2011 | Cortesi et al. | 290/55 |
| 2011/0027084 A1 * | 2/2011 | Rekret | 416/176 |
| 2011/0080002 A1 | 4/2011 | Santana | |
| 2011/0109089 A1 | 5/2011 | Frye | |
| 2011/0109091 A1 | 5/2011 | Greyshock | |
| 2011/0171025 A1 * | 7/2011 | Levine et al. | 416/223 R |
| 2011/0200437 A1 * | 8/2011 | McGuire | F03B 3/123 416/176 |
| 2011/0221198 A1 | 9/2011 | Evans | |
| 2012/0032446 A1 | 2/2012 | Rohrer | |
| 2012/0086208 A1 | 4/2012 | Gray | |
| 2012/0098267 A1 | 4/2012 | Hockenberger et al. | |
| 2012/0099997 A1 * | 4/2012 | Song et al. | 416/210 R |
| 2012/0153619 A1 | 6/2012 | Chan | |
| 2013/0170949 A1 * | 7/2013 | Samuels | 415/1 |
| 2015/0192107 A1 * | 7/2015 | Kirchman | 3/61 |

FOREIGN PATENT DOCUMENTS

| | | | | |
|---|---|---|---|---|
| GB | 2404227 A | * | 1/2005 | F03D 3/06 |
| JP | 10110666 A | * | 4/1998 | F03D 3/06 |
| JP | 2004316551 A | * | 11/2004 | F03D 3/06 |
| JP | 2013253545 A | * | 12/2013 | F03D 3/06 |
| WO | WO 2013109133 A1 | * | 7/2013 | F03D 3/06 |

* cited by examiner

TURBINE APPARATUS AND METHODS

RELATED APPLICATION DATA

This application claims priority to U.S. Patent Application No. 61/624,081, filed Apr. 13, 2012, entitled APPARATUS AND METHOD FOR ENHANCED HYDRO-TURBINES, and invented by Steven D. Beaston, the entirety of which is hereby incorporated by reference. U.S. Pat. Nos. 6,933,624 and 6,831,373 are also each hereby incorporated in their entireties by reference.

FIELD OF THE INVENTION

This invention relates to turbines and methods for their use, for generating power utilizing the flow of water or other fluids. In certain embodiments, this invention relates to turbines with helical blades oriented to efficiently intercept off axis or angular fluid flow, such as presented by whirlpool water flow patterns. In certain preferred embodiments, this invention relates to turbines having helical blades with major blade surfaces oriented to take advantage of whirlpool or circular-angle flow patterns, depending on geographic location of installation in the northern or southern hemisphere. In still other embodiments, this invention relates to turbines in which the pitch of rotor and/or helical blade surfaces is variable.

BACKGROUND OF THE INVENTION

Because the supply of fossil fuels, natural gas, and other natural fuels is finite and because the processing and/or consumption of such fuels produces significant detrimental amounts of pollution, alternatives to such fuels have been experimented with, and in some cases implemented over the years. The need for alternatives to such natural, pollution producing fuels is further compounded by the rapidly expanding population of the Earth which is increasing the consumption of such fuels at an exponential rate.

As a result, heretofore, various alternatives to such fuels have been experimented with over the years. For example, many attempts have been made at harnessing the power of solar energy, water energy, or so-called non-polluting gases such as hydrogen. In this regard, although various hydropower machines have been developed and/or proposed in recent times, few of these machines have been successful in practical application, a notable exception being a conventional turbine.

Although the earliest turbines are believed to have been developed in the $19^{th}$ century, improvements in turbine designs, as well as in their implementations in power generation systems, are desirable in the art. For example, it would be desirable to have a turbine design that is able to take advantage of the tendency of fluid, such as water, to flow in circular-angle patterns (or other off axis patterns), such as whirlpool patterns, such as when fluid flows through confined pathways such as pipes, conduits, penstocks, and/or draft tubes.

In view of these and other desires for improvements in the art, it is a purpose of the herein described inventions to address one or more of such desires as well as, or in the alternative, other needs which will become more apparent to the skilled artisan once given the present disclosure.

SUMMARY OF THE INVENTION

Generally speaking, this invention fulfills the above-described needs in the art by providing turbines and methods for their use, for generating power utilizing the flow of water or other fluids.

In at least one example embodiment, there is provided: a turbine installed in a confined fluid flow path comprising: a rotor having a shaft portion, said rotor having an axis of rotation; at least two rotor blades operably connected to and extending from said shaft portion of said rotor; helical vane blades extending from each of said at least two rotor blades, having curved configurations, and having connections to said shaft portion of said rotor at locations spaced axially from said connections of said at least two rotor blades to said shaft portion; and wherein said helical vane blades are oriented at different angular orientations than said rotor blades, and said helical vane blades being oriented at specific angles so as to have major vane blade surfaces positioned to intercept off axis, angular fluid flow.

In certain example embodiments, turbines with helical blades oriented to efficiently intercept off axis or angular fluid flow, such as presented by whirlpool water flow patterns, are provided.

In certain preferred embodiments, turbines are provided having helical blades with major blade surfaces oriented to take advantage of whirlpool or circular-angle flow patterns, depending on geographic location of installation in the northern or southern hemisphere. In these or other example embodiments described herein, the pitch of the rotor and/or helical blade surfaces is variable based on water (or other fluid) flow or power generation needs. In such or other embodiments, one or more of the example turbines disclosed herein may be installed in a power generation system having a fluid flow path or pattern which includes, at least part of the time, circular or off axis angles of fluid flow. In such embodiments, certain example turbines are configured so that their helical vane blades have major blade surfaces oriented at angles to efficiently intercept off axis or angular fluid flow. That is, in certain example embodiments, the major blade surfaces are oriented, depending on their location of installation in the northern or southern hemisphere, so that their major blade surfaces are poised to better intercept clockwise or counter-clockwise whirlpool flow patterns, and then convert such angular fluid flow to useful energy more efficiently than prior art turbines.

In certain example embodiments, mechanical control mechanisms, such as motorized pitch controls, are provided to vary or tailor the pitch of angles of the rotor blades and/or the helical vane blades. They may be operated manually or may operate automatically to adjust blade pitch based on sensed conditions measured by provided flow sensors, for example. In other or similar embodiments, they may operate automatically based on predetermined, preset, or sensed or measured power needs.

In some example embodiments in which variable blade pitches are provided in the turbines, the helical vane blades are connected to the rotor blades via pivot connections (e.g., to prevent physical strain from harming or stressing the blades or turbine). In other example embodiments utilizing variable blade pitches, the helical vane blades are connected to the rotor blades via flexure or flexible connections. Of course, combinations of hinged and flexible or flexure connections may also be used between the helical and rotor blade portions. In still other example embodiments, and also useful to prevent strain in the turbine system or blades, the helical vane blades are connected to the shaft portion of the turbine rotor by a slideable joint, such as a male/female spline joint. By employing a slideable connection, when the pitch of the rotor and/or helical vane blades is adjusted, the slideable joint permits the connection point to travel up or down axis to accommodate or prevent physical stresses from being introduced into the blades (and/or retained within the blades) as a result of corresponding blade lengthening or shortening, while still providing for the efficient transmission of power or force to the rotor shaft. In such embodiments, or in alternative embodiments, a slideable joint or connection may also be employed between the rotor blades and the rotor shaft. Pivot connections, such as between the rotor shaft and the helical blades, may additionally be employed (e.g., such as using a shoulder bolt). Of course, when utilizing such joints or connections, low friction materials and/or lubricants may be employed (though not required) to facilitate proper or smooth operation by reducing friction among moving parts.

In still further example embodiments, a conical or beveled lip may be used to improve or promote smooth fluid flow over turbine parts, such as over the male/female spline joint connection of the helical vane blade to the rotor shaft. In other example embodiments, a cone is utilized on the downstream end of the shaft to minimize turbulence.

Certain examples of the invention are now described below with respect to certain non-limiting embodiments thereof as illustrated in the following drawings wherein:

BRIEF DESCRIPTION OF CERTAIN EXAMPLE DRAWINGS

The drawings submitted with and which form a part of this patent application each illustrate an embodiment, or one or more components of an embodiment, of a non-limiting example of Applicant's invention. While these drawings depict certain preferred embodiments of Applicant's invention, as well as certain particularly desirable features thereof, they are intended to be examples only and should not be construed to limit the scope of Applicant's invention.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

In the northern hemisphere of the earth, water draining through a narrowing conveyance or passageway, such as a pipe or conduit, forms an angular flow pattern or whirlpool traveling in a counter-clockwise direction. In the southern hemisphere, a similar angular flow pattern forms during draining, albeit in a clockwise direction. Since, in a hydropower system, water drains from a reservoir into and through narrow piped conveyances such as penstocks and draft tubes, whirlpools or off axis or angular flow patterns form in these hydro-power system conveyances. The present invention, in order to take advantage of the natural tendency of water to form off axis or angular flow patterns (e.g., whirlpools), provides a unique hydro-turbine 101 to intercept these angular or off axis flow forces more efficiently or more optimally.

Figure 1:
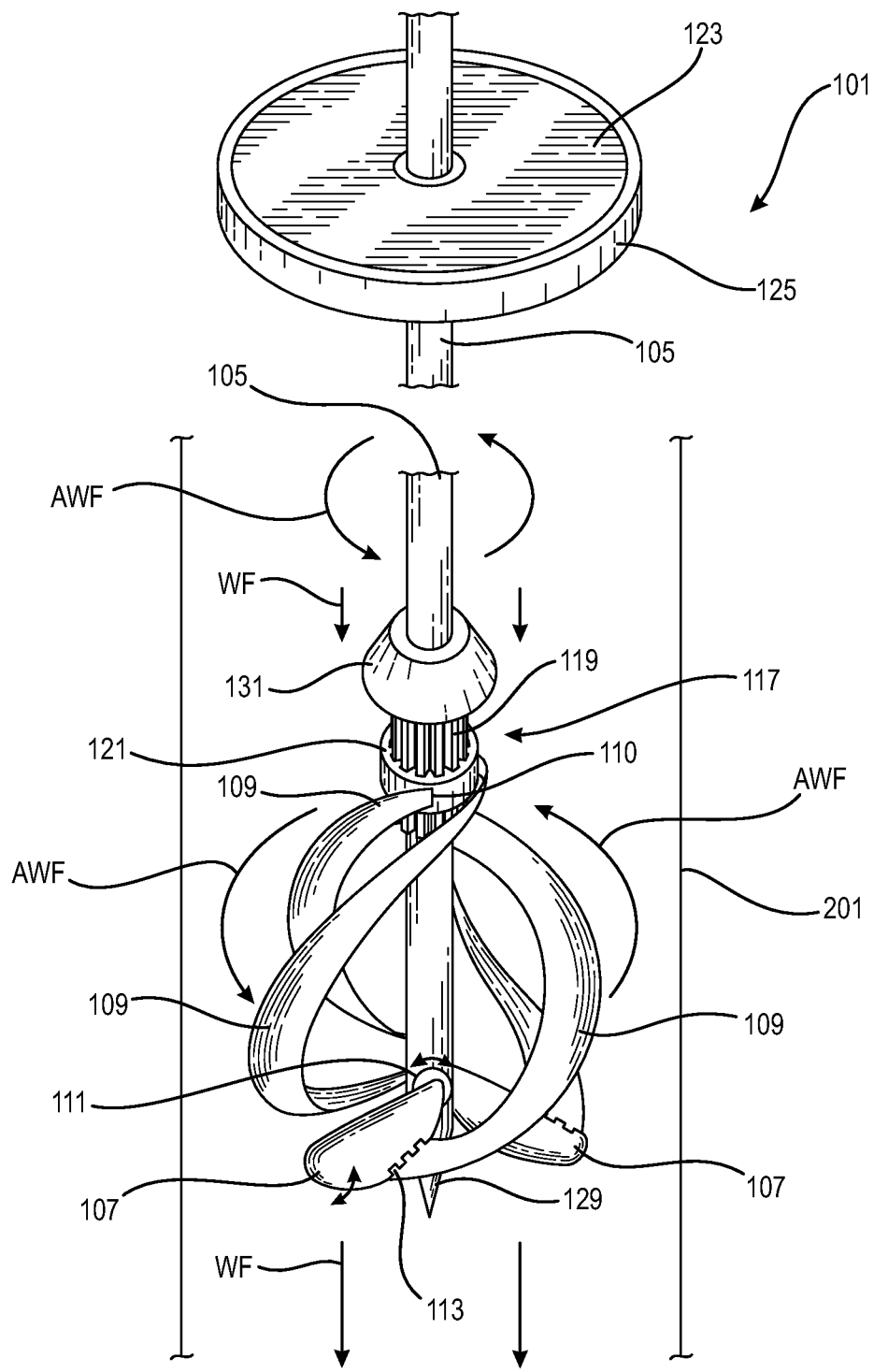
FIG. 1 is a three-dimensional, perspective view of one embodiment of an example turbine, including an example power extraction mechanism, according to the subject invention.

In this regard, turbine 101, such as illustrated in FIG. 1, generally comprises a shaft 105, rotatable about its own central axis, having a plurality of rotor blades 107 connected to and extending outwardly from the rotor shaft. Helical vane blades 109 extend from each of the rotor blades and curve upwards (or "upstream"), around a portion of the rotor shaft circumference, where they are connected to the shaft at a distance axially spaced from the rotor blades. The upper end of shaft 105 is, in turn, preferably operably connected to a rotor body 123 which turns within a stator body 125, as shaft 105 rotates about its axis, to generate power during turbine operation. Other mechanisms or methods of extracting power from the turbine, however, may of course be employed.

Figure 3:
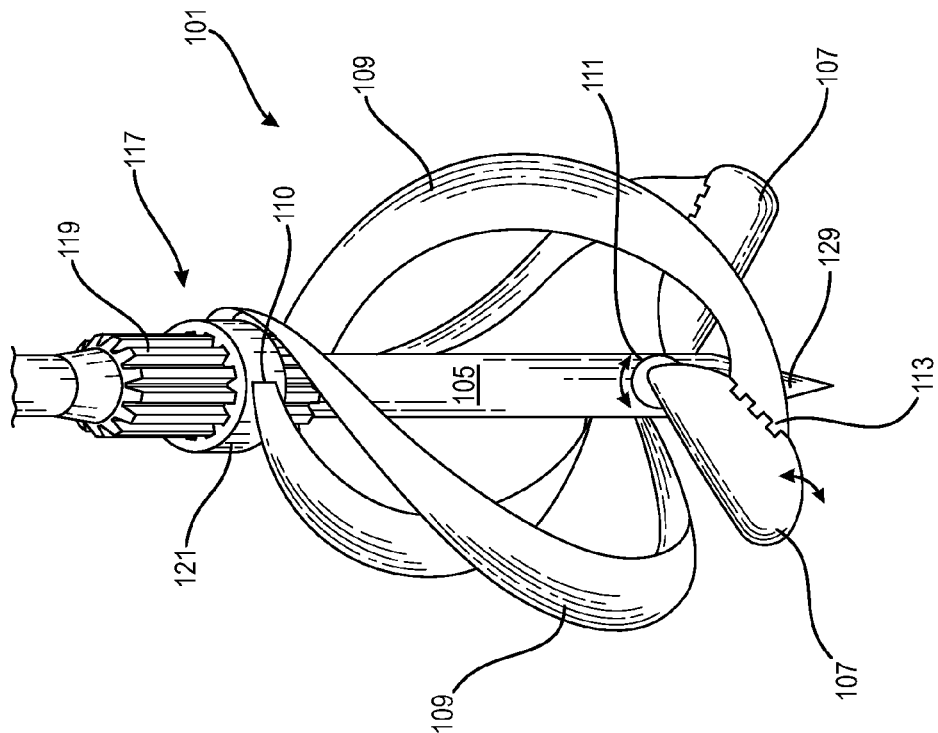
FIG. 3 is a three-dimensional, perspective view of a further alternative example of a turbine according to the subject invention, having a variable blade pitch.
Figure 2:
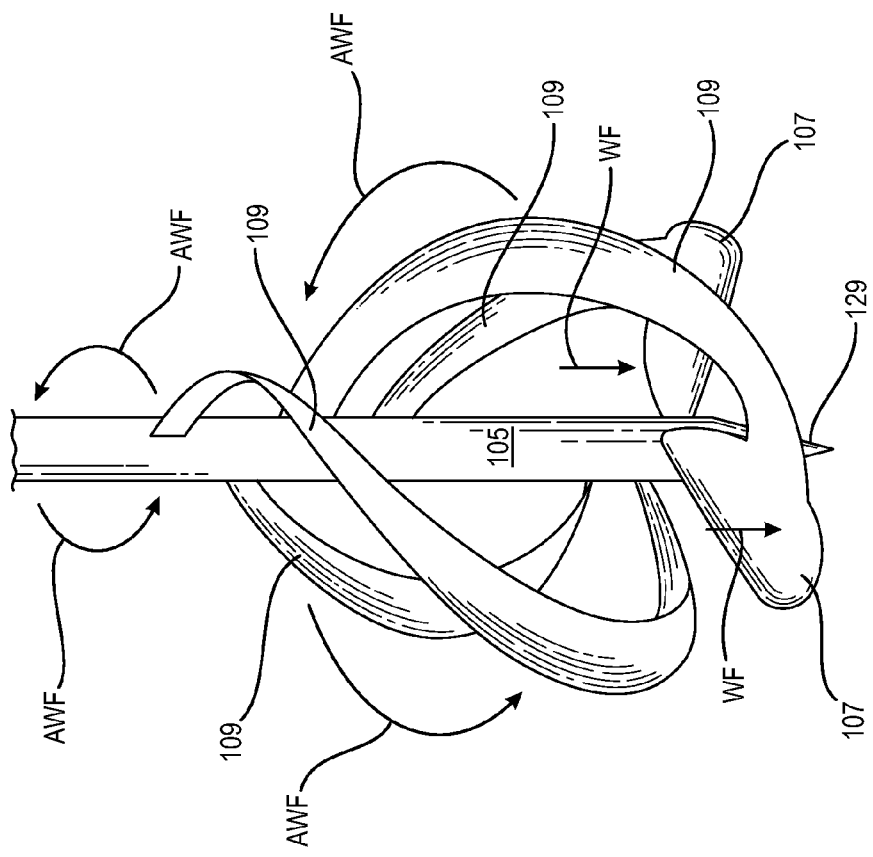
FIG. 2 is a three-dimensional, perspective view an alternative example of a turbine according to the subject invention.

As may be seen on the drawings, helical vane blades 109 are configured into different angular orientations than rotor blades 107. This is because, for example, the inventor has found that it is advantageous for rotor blades 107 to be oriented to intercept generally linear water flow patterns (e.g., linear or perpendicular water flow "WF") while orienting helical vane blades 109 to intercept off axis or angular water flow patterns (e.g., angular water flow "AWF"), such as presented by a whirlpool flow. More specifically, in preferred example embodiments, the angular orientation of helical vane blades 109 is selected or tailored depending on whether the turbine will be installed in the northern or southern hemisphere. In one such example, such as shown in FIGS. 1-3, helical vane blades 109 are configured and oriented so that they have major blade surfaces which efficiently and/or more optimally intercept counter-clockwise water flow in a northern hemisphere installation location (e.g., within a conduit or pipe 201, such as illustrated in FIG. 1). Conversely, if the turbine were to be installed in the southern hemisphere, the helical vane blade orientation would preferably be reversed.

In particular, turbine 101, as depicted in the drawings, presents more blade face or surface area in the path of off axis or angular water flows (e.g., water flowing in circular-angles), by providing more vertically oriented helical vane blade surfaces which also face the originating direction of anticipated whirlpool flow type currents (e.g., based on hemisphere location). When such blade configurations are used in combination with a horizontal propeller type turbine blade, distinct advantages and/or power conversion efficiencies in hydropower systems may be achieved. As shown in the drawings, helical vane blades 109 may be continuous extensions of rotor blades 107 such as depicted in FIG. 2. (e.g., extending outward and curving upward and attaching to the turbine shaft). In other embodiments, helical vane blades 109 may be separate structures joined to the rotor blades via a hinge or pivot type joint, or even by a flexible or flexure type joint. The vane blades may have different widths for different applications or installations. For example, they may share the entire width of the rotor blades at the intersection between the two blades, or, in other examples, the helical vane blades may have substantially reduced or tapered widths. Although all edges are preferably tapered, beveled and/or otherwise made smooth to prevent turbulence, other edge types or configurations may of course be used.

In certain embodiments, such as the example embodiment depicted in FIG. 3, hinged blade connections (e.g., hinge connection 113) or flexible or flexure blade connections are desirable to accommodate variable blade pitches. More specifically, the example turbine 101 depicted in FIG. 3 includes one or more rotor blades 107 which are pitch adjustable. In this example turbine depicted, rotor blade 107 is pivotally connected to a hub and is therefore rotatable about an axis extending perpendicular from the hub. Rotation about the axis, and therefore variation of the blade pitch, may be achieved by operating a mechanical control 111 which may be manually or automatically operated (e.g., via computer control and/or automated software controls). All, or only a few of the rotor blades may be designed to be pitch adjustable depending on desired design parameters or specifications. In particular, by providing the ability for one or more rotor blades to be pitch adjustable, the efficiency of the turbine may be tailored to match different operating conditions, such as related to power requirements or high or low water flows. Wicket gates, whether fixed or adjustable, may also be installed with the turbine installation to regulate fluid flow to the turbine blades.

In embodiments which employ pitch variable blades, a non-fixed connection between the helical vane blades and the rotor shaft is desirable to account for the lengthening or shortening of the effective blade length as pitch of a connected rotor blade is adjusted. For example, a slideable joint connection, such as a male/female spline joint 117 illustrated in FIG. 3 (including spline teeth portion 119), may be used to operably connect the helical vane blade to the rotor shaft. Similarly, and also to account for or permit vane blade position adjustment when rotor pitch is adjusted, a pivot or hinged connection 110 is preferably employed to connect the vane blade to the splined collar portion 121 of the slideable joint. Moreover, in certain example, preferred embodiments, a conical shield 131 is installed upstream of the spline joint 117 to promote smooth or less obstructed water flow past the spline joint region. Furthermore, in this and other example embodiments, a cone end 129 may be utilized at the termination of the rotor shaft to reduce and/or minimize turbulence.

In certain example variable pitch embodiments, rotor blade pitch is adjustable from a maximum pitch where the face of the rotor blades approaches or reaches a state of parallel relative to the axis of the rotor shaft, to a minimum pitch in rotor blade surfaces in which the blade surfaces are arranged in a close to or generally perpendicular orientation with respect to the axis of the rotor shaft.

Figure 4:
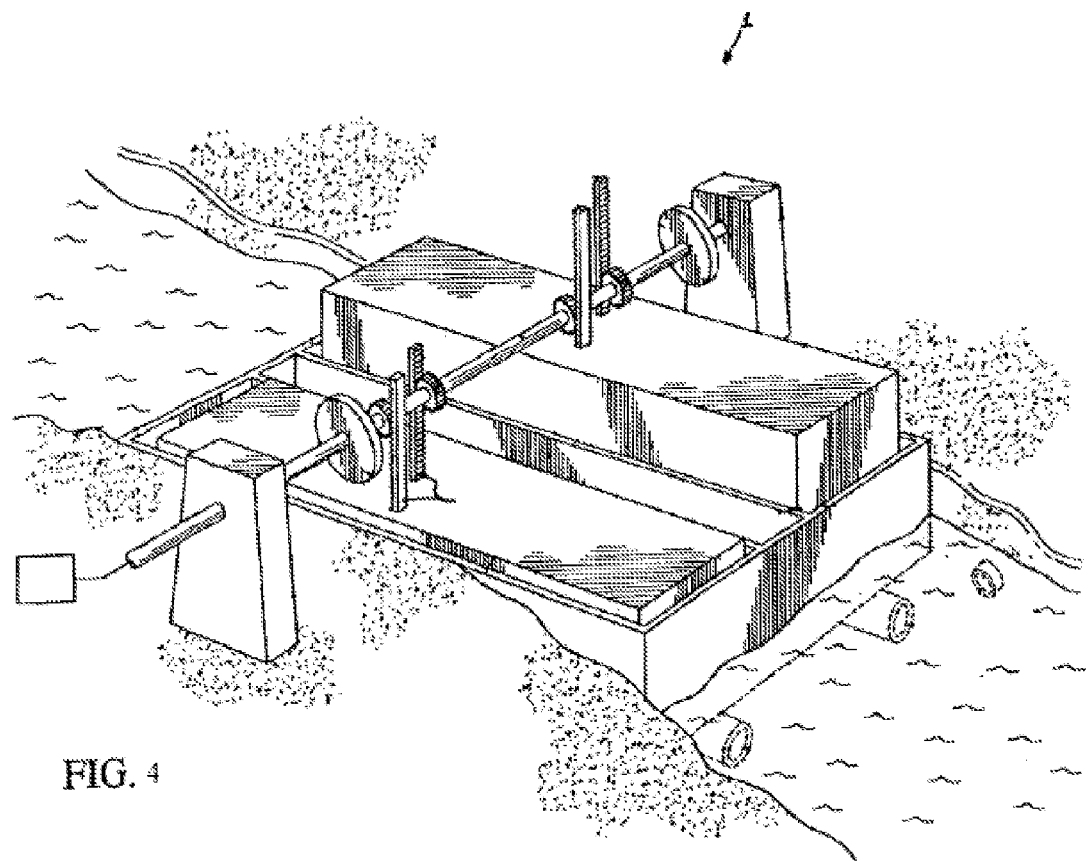
FIG. 4 is a three-dimensional perspective view of one embodiment of a hydropower apparatus useful with the subject invention.
Figure 5:
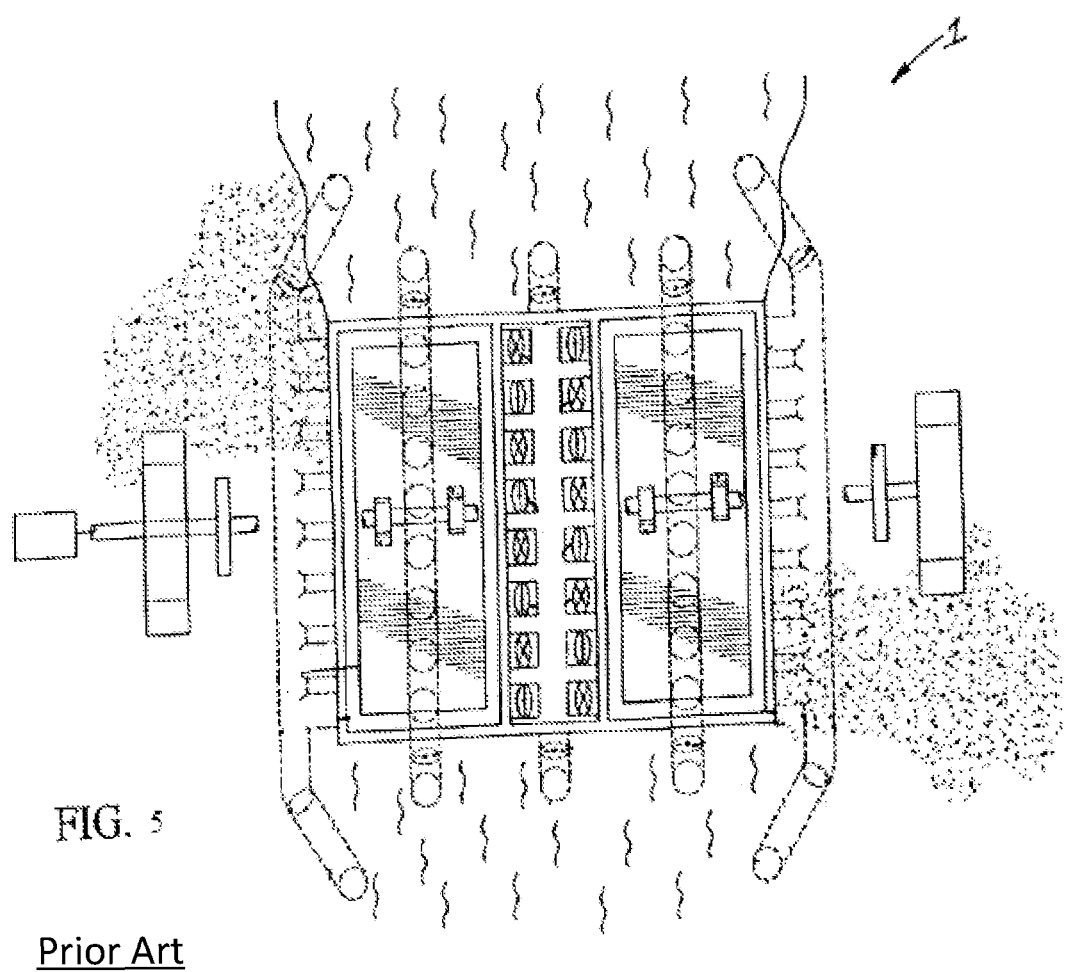
FIG. 5 is an overhead, plan view of the hydropower apparatus illustrated in FIG. 4 with certain parts shown in x-ray.

Referring now to FIGS. 4 and 5, an exemplar embodiment of a hydropower apparatus 1 which is useful with the above-described turbine related inventions is illustrated therein. This hydropower apparatus is more fully described in U.S. Pat. Nos. 6,933,624 and 6,831,373. It is of course possible to use the above-described turbines in other hydropower systems or even in other applications not related to hydropower, without departing from the scope of the subject invention.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined:

I claim:

1. A turbine installed in a confined fluid flow path comprising:
   a rotor having a shaft portion, said rotor having an axis of rotation;
   at least two rotor blades operably connected to and extending from said shaft portion of said rotor;
   helical vane blades extending from each of said at least two rotor blades, having curved configurations, and having connections to said shaft portion of said rotor at locations spaced axially from said connections of said at least two rotor blades to said shaft portion;
   wherein said helical vane blades are oriented at different angular orientations than said rotor blades, and each of said helical vane blades being oriented at an angle so as to have major vane blade surfaces positioned to intercept off axis, angular fluid flow;
   said turbine installed in a fluid flow path:
      wherein helical vane blade orientations are utilized in said turbine which place said major blade surfaces at angles to intercept off axis angular fluid flow, flowing in at least one of a clockwise whirlpool flow pattern and a counter-clockwise whirlpool flow pattern, said angles being selected in accordance with a location of installation of said turbine in a northern or southern hemisphere region to place said major blade surfaces in pathways of corresponding directions of angular whirlpool flow patterns;
      wherein each of said at least two rotor blades has variable pitch angles;
      wherein said helical vane blades have variable pitch angles; and
   said turbine further including at least one mechanical control mechanism operable to vary said pitch angles of said at least two rotor blades or said helical vane blades.

2. The turbine according to claim 1 wherein each of said helical vane blades connect to one of said at least two rotor blades via pivot connections.

3. The turbine according to claim 2 wherein each of said helical vane blades connect to said shaft portion of said rotor via a slideable male-female spline joint.

4. The turbine according to claim 1 wherein each of said helical vane blades connect to one of said at least two rotor blades via flexure connections.

5. The turbine according to claim 4 wherein each of said helical vane blades connect to said shaft portion of said rotor via a slideable male-female spline joint.

* * * * *